United States Patent
Desagulier et al.

(10) Patent No.: US 7,093,804 B2
(45) Date of Patent: Aug. 22, 2006

(54) FOLDABLE AND DEPLOYABLE ASSEMBLY OF ELEMENTS MOUNTED ON BOARD A SPACECRAFT

(75) Inventors: Christian Desagulier, Conflans Sainte Honorine (FR); Patrick Cordier, Montesson (FR); Stéphane Baril, Boulogne Billancourt (FR)

(73) Assignee: EADS Space Transportation SA, Paris (FR)

( * ) Notice: Subject to any disclaimer, the term of this patent is extended or adjusted under 35 U.S.C. 154(b) by 196 days.

(21) Appl. No.: 10/808,304

(22) Filed: Mar. 25, 2004

(65) Prior Publication Data

US 2004/0245402 A1     Dec. 9, 2004

(30) Foreign Application Priority Data

Apr. 14, 2003   (FR) .................................. 03 04632

(51) Int. Cl.
    *B64G 1/44*     (2006.01)
(52) U.S. Cl. ................................ 244/158.3; 244/172.7

(58) Field of Classification Search ............ 244/158 R, 244/173, 168; 52/71, 111; 136/292, 245
See application file for complete search history.

(56) References Cited

U.S. PATENT DOCUMENTS

| 3,386,128 | A | | 6/1968 | Vyvyan |
| 3,510,086 | A | | 5/1970 | Arbeitlang et al. |
| 3,606,211 | A | | 9/1971 | Roersch et al. |
| 5,086,541 | A | | 2/1992 | Auternaud et al. |
| 5,785,280 | A | * | 7/1998 | Baghdasarian ............ 244/173 |
| 6,343,442 | B1 | * | 2/2002 | Marks .......................... 52/71 |
| 6,568,640 | B1 | * | 5/2003 | Barnett ..................... 244/173 |

FOREIGN PATENT DOCUMENTS

| FR | 2122087 | 8/1972 |
| FR | 2635077 | 2/1990 |
| JP | 2001 106196 | 4/2001 |

* cited by examiner

*Primary Examiner*—Galen Barefoot
(74) *Attorney, Agent, or Firm*—Stevens, Davis, Miller & Mosher, LLP

(57) ABSTRACT

According to invention, said elements (1.1 to 1.*n*) are secured to the same side (3) of a flexible inflatable mattress (4) and, when said elements are in the folded state, said mattress (4) is in the deflated state and is folded so that said elements are situated in pairs on either side of a fold (5.1 to 5.*n*−1) of said mattress.

10 Claims, 3 Drawing Sheets

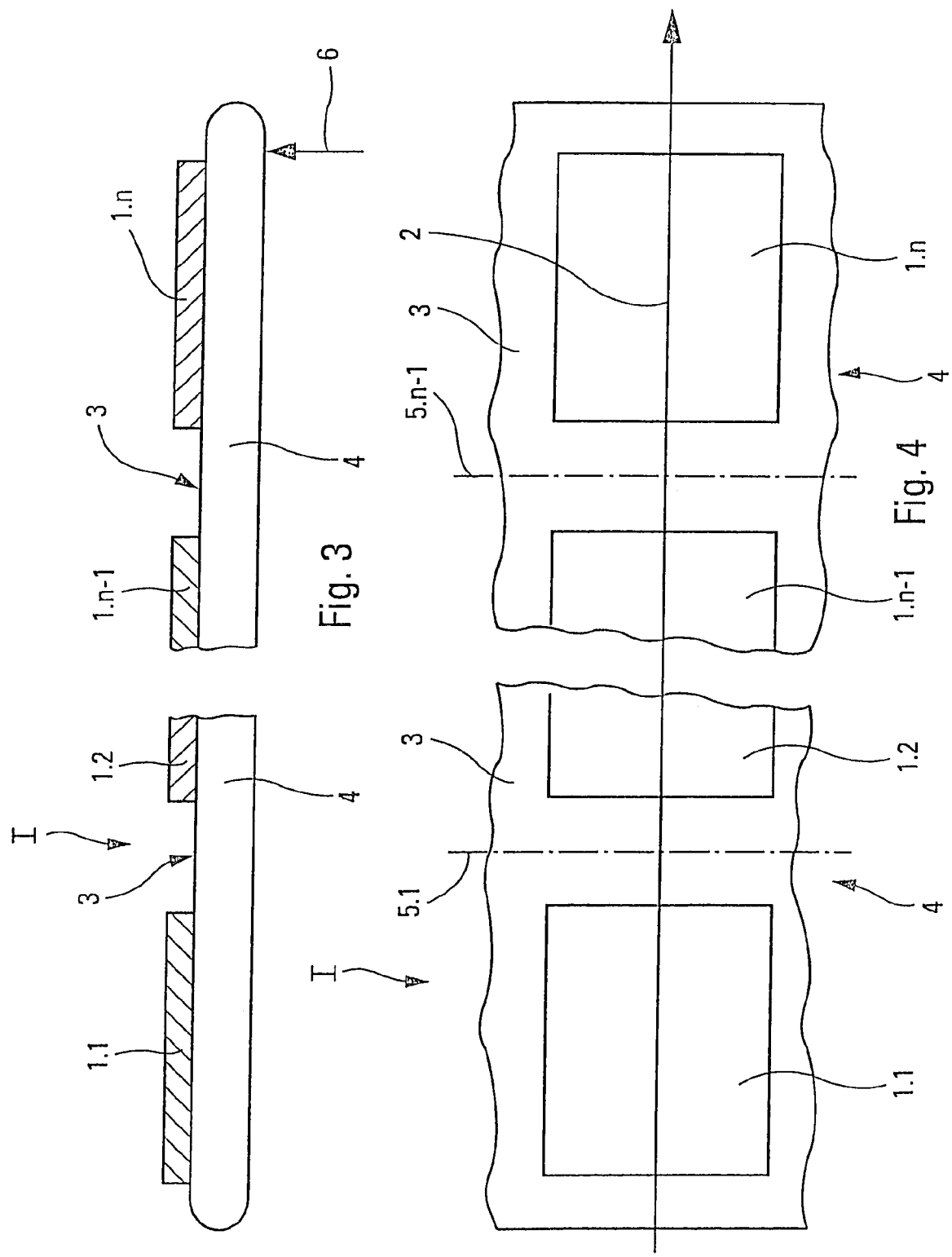

FOLDABLE AND DEPLOYABLE ASSEMBLY OF ELEMENTS MOUNTED ON BOARD A SPACECRAFT

Figure 1:
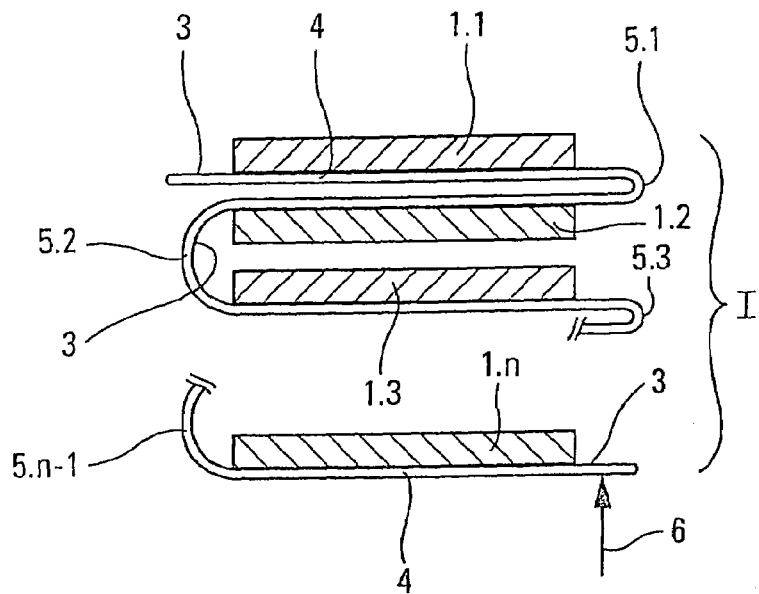

The present invention relates to a foldable and deployable assembly of elements mounted on board a spacecraft.

It is known that many devices, such as solar generators, radio antennas, sun shields, etc., are composed of an assembly of elements articulated to one another so that said assembly may be folded and take up a minimum amount of space on board a spacecraft, before and during the launch of the latter. After said craft has been put into space, said assembly of elements is deployed so that the device may assume its operational configuration.

For the articulation of such elements, it is known practice to use automatic-deployment articulation systems such as those described, for example, in documents U.S. Pat. No. 3,386,128, FR-2 122, 087 and FR-2 635 077. To deploy these systems automatically, they use the energy of springs that are tensed when said elements are in the folded position.

Such automatic articulation systems are relatively heavy and complicated and it is difficult to control their deployment especially with regard to the initial instant and speed of deployment.

The aim of the present invention is to overcome these drawbacks.

For this purpose, according to the invention, the assembly of at least two elements that is intended to be mounted on board a spacecraft and in which said elements may occupy with respect to one another either a folded position or a deployed position is noteworthy in that said elements are secured to the same side of a flexible inflatable mattress and in that, when said elements are in the folded state, said mattress is in the deflated state and is folded so that said elements are situated in pairs on either side of a fold of said mattress.

Thus, when, starting from the state in which said elements are folded and from the state in which said mattress is deflated, the latter is inflated, the subsequent increase in volume of said mattress results in the folds of the latter being opened and, consequently, in said mattress and the elements borne by it being deployed.

The inflation of said mattress may result from the expansion, in space, of the gas contained in said mattress in the deflated state, on earth. However, to avoid any complication that might be due to the residual air in the mattress during the launch of the spacecraft, it is preferable, on earth, for said mattress to be evacuated and, in space, for the inflation to be achieved by blowing in an inflating gas.

It is possible to lock said elements relative to one another in the deployed position using many different techniques. For example, said locking may be achieved by stiffening the mattress with the aid of any physicochemical stiffening system in orbit, for example a curable resin. In the latter case, said mattress may be impregnated on the inside with such a resin that can be cured by a catalyst carried by the gas for inflating said mattress. Said mattress may also be impregnated on the outside by a resin that can be cured under the action of ultraviolet radiation.

It will be noted that, because said elements are locked relative to one another in such a way in the deployed position, there is no need to maintain a nominal value of the inflation pressure in said mattress in order to stiffen the latter, an operation which would be difficult to achieve on account of the inevitable microleakages in the inflation circuit.

According to the way in which said folds are formed in the deflated mattress, said folded mattress may either be arranged between two of said elements that are adjacent or surround two such adjacent elements.

In the case where said assembly comprises a plurality of elements forming at least one alignment, it is advantageous that, when said mattress is in the deflated state and when said elements are in the folded state, said mattress be folded on itself around fold lines that each pass between two consecutive elements of said alignment and that are directed transversely with respect to said alignment so that, in turn, said folded mattress is arranged between two consecutive elements and surrounds two consecutive elements.

If, moreover, said plurality of elements forms an array of rows and columns, when said mattress is in the deflated state and when said elements are in the folded state, said mattress can advantageously be folded on itself around fold lines that each pass between two columns and/or rows of elements so that, in turn, said folded mattress is arranged between two consecutive columns and/or rows of elements and surrounds two consecutive columns and/or rows of elements.

The figures of the appended drawing will provide a clear understanding of how the invention may be implemented. In these figures, identical references are used to denote like elements.

FIG. 1 shows, in schematic partial cross section, an assembly of elements according to the present invention, in the folded position.

Figure 2:
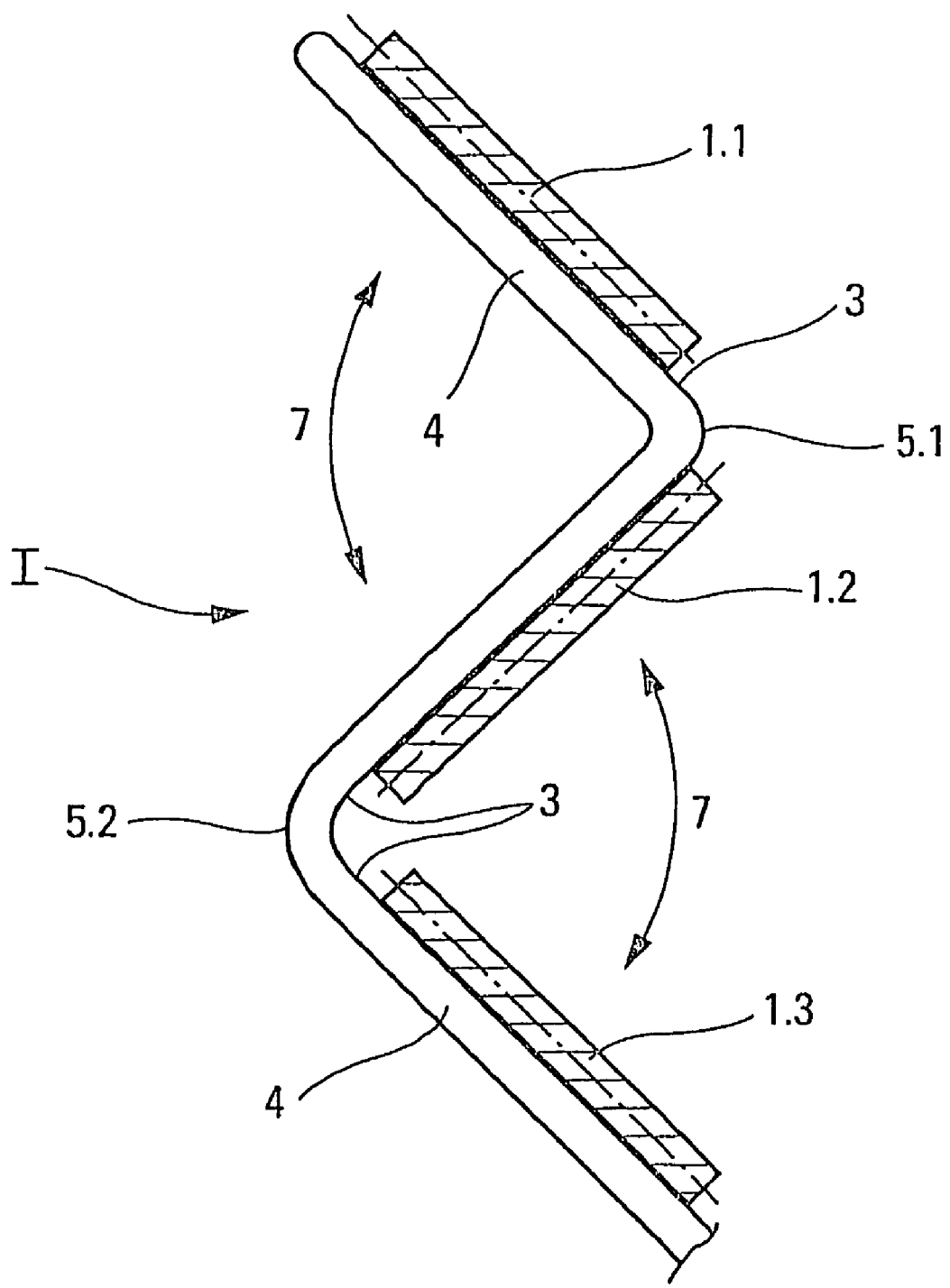

FIG. 2 schematically illustrates the deployment of the assembly of elements shown by FIG. 1.

FIGS. 3 and 4 schematically illustrate in cross section and in plan view, respectively, the assembly of elements of FIG. 1 in the deployed position.

Figure 5:
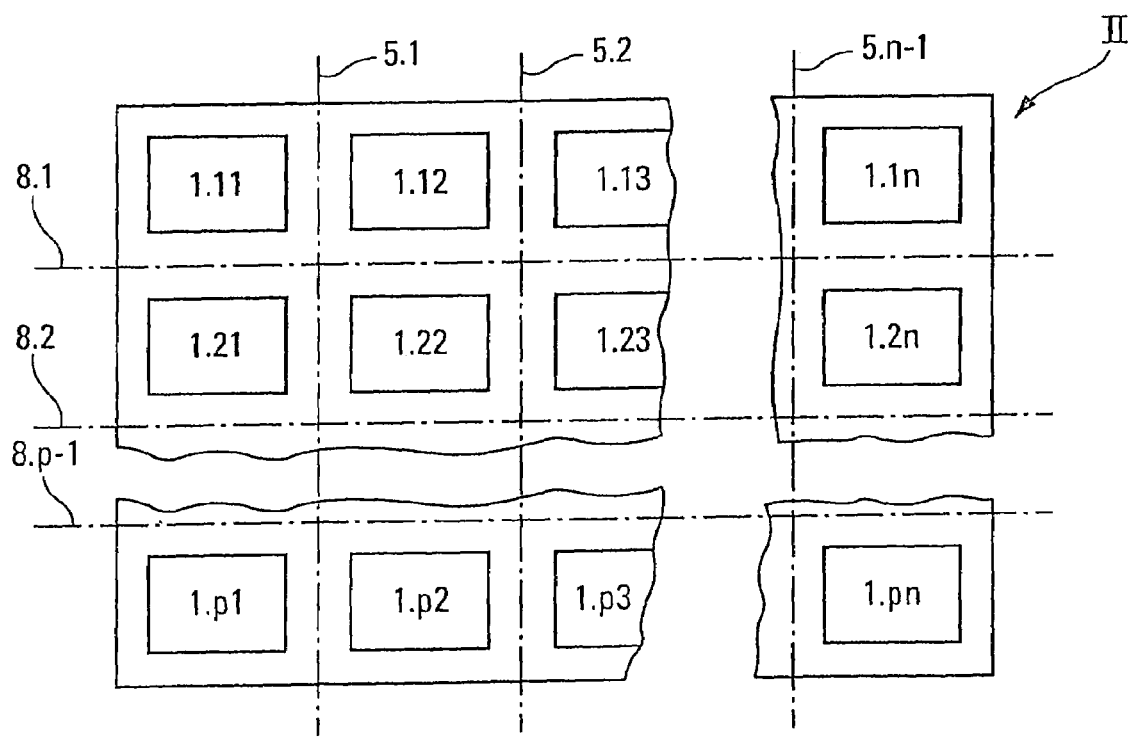

FIG. 5 schematically shows another embodiment of said assembly of elements according to the present invention.

The assembly I of elements according to the present invention and depicted in FIGS. 1 to 4 comprises n elements having the references 1.1, 1.2, 1.3, . . . , 1.$n$–1, 1.$n$, respectively. These elements belong to a device (solar generator, antenna, sun shield, etc.) mounted in a folded position on board a spacecraft and deployed after the latter has been put into space. In the folded state (see FIG. 1), the elements 1.1 to 1.$n$ are, for example, collapsed on one another and kept in this state by means of locks (not shown). When deployed, said elements 1.1 to 1.$n$ form an alignment, as is symbolized in FIG. 4 by the axis 2.

These elements 1.1 to 1.$n$. are all secured to the same side 3 of a flexible inflatable mattress 4.

As is shown in FIG. 1, when said elements 1.1 to 1.$n$ are in the folded state, the mattress 4 is in the deflated state and is folded so that said elements 1.1 to 1.$n$ are situated in pairs on either side of a fold line 5.1, 5.2, . . . , 5.$n$–1 of said mattress 4. These fold lines, or folds, 5.1 to 5.$n$–1 each pass between two consecutive elements 1.1 to 1.$n$ and are directed transversely with respect to said alignment 2 (as illustrated in FIG. 4).

In the folding mode illustrated in FIG. 1, when the mattress 4 is in the deflated state and when the elements 1.1 to 1$n$ are in the folded state, it can be seen that, in turn, the mattress 4:

is arranged between the two adjacent elements 1.1 and 1.2; 1.3 and 1.4, . . . , etc.; and surrounds the two adjacent elements 1.2 and 1.3; . . . ; 1.$n$–1 and 1.$n$.

This mattress 4 may preferably be inflated from a gas source (not shown) by way of an inflating pipe 6.

Thus, when said elements 1.1 to 1.*n*, in the folded state, are to be deployed and when said locks for keeping them in this state have been removed, inflating gas is passed into the pipe 6, this allowing said mattress 4 to be inflated. The increase in volume of this mattress tends to open the folds that it comprises and said elements are moved away from one another by being rotated about axes that are at least approximately coincident with said fold lines 5.1 to 5.*n*−1, as is schematically illustrated in FIG. 2 with the aid of the arrows 7. By continuing the inflation, it is possible to completely deploy said mattress 4 and said elements 1.1 to 1.*n* so as to arrive at the deployed state illustrated by FIGS. 3 and 4.

It can thus readily be seen that, by virtue of the present invention, it is possible to have total control over the instant at which deployment commences and the process of deployment, and also to completely dispense with any mechanical articulation system.

When complete deployment is achieved, the mattress 4 may be stiffened in this deployed position, for example using a curable resin. This resin may be pre-impregnated over the outer surfaces of said mattress and be of the type that can be cured by the ultraviolet radiation in space. As an alternative, the curable resin may pre-impregnate the inner wall of the mattress 4 and be sensitive to a curing agent carried by the inflating gas.

FIG. 5 depicts, in the deployed state, an array II of a plurality of elements 1.11 to 1.*pn*. This array II comprises p rows, each similar to the alignment 2 of FIG. 4, arranged so that said elements additionally form columns. It will readily be understood that, in this case, the fold lines 5.1, 5.2, . . . , 5.*n*−1 each pass between two adjacent columns of elements. Thus, when the mattress 4 is in the deflated state and in the folded state, the columns of elements are folded on one another around fold lines 5.1, 5.2, . . . , 5.*n*−1, in the manner shown in FIG. 1 for the elements 1.1 to 1.*n*.

In addition to the inter-column fold lines 5.1 to 5.*n*−1, the array II may comprise inter-row fold lines 8.1 to 8.*p*−1 for folding on themselves (in the manner of FIG. 1) said columns of elements that are already folded on one another around the fold lines 5.1 to 5.*n*−1.

What is claimed is:

1. An assembly comprising at least two elements and a mattress, said assembly for being mounted on board a spacecraft, said elements for occupying relative to one another either a folded state or a deployed state, wherein said at least two elements are secured to a same side of said flexible inflated mattress and wherein, when said at least two elements are in the folded state, said mattress is in the deflated state and is folded so that said at least two elements are situated in pairs on either side of a fold of said mattress.

2. The assembly as claimed in claim 1, wherein inflation of said mattress results from expansion, in space, of the gas contained in said mattress in the folded state, on earth.

3. The assembly as claimed in claim 1, wherein inflation of said mattress is achieved by blowing in an inflating gas.

4. The assembly as claimed in claim 1, further comprising means for stiffening said mattress when said at least two elements are in the deployed state.

5. The assembly as claimed in claim 4, wherein said stiffening means comprise a curable resin.

6. The assembly as claimed in claim 1, wherein, when said mattress is in the deflated state and when said at least two elements are in the folded state, said deflated and folded mattress is arranged between two adjacent ones of said at least two elements.

7. The assembly as claimed in claim 1, wherein, when said mattress is in the deflated state and when said at least two elements are in the folded state, said deflated and folded mattress surrounds two adjacent ones of said at least two elements.

8. The assembly as claimed in claim 6, wherein a plurality of said at least two elements forms at least one alignment and wherein, when said mattress is in the deflated state and when said at least two elements are in the folded state, said mattress is folded on itself around fold lines that each pass between two consecutive elements of said alignment and that are directed transversely with respect to said alignment so that, in turn, said folded mattress is arranged between two consecutive elements of said alignment and surrounds two consecutive elements of said alignment.

9. The assembly as claimed in claim 8, wherein said plurality of said at least two elements forms an array of rows and columns and wherein, when said mattress is in the deflated state and when said at least two elements are in the folded state, said mattress can be folded on itself around fold lines that each pass between two of said columns of elements so that, in turn, said folded mattress is arranged between two consecutive ones of said columns of elements and surrounds two consecutive ones of said columns of elements.

10. The assembly as claimed in claim 8, wherein said plurality of said at least two elements forms an array of rows and columns and wherein, when said mattress is in the deflated state and when said at least two elements are in the folded state, said mattress can be folded on itself around fold lines that each pass between two of said rows of elements so that, in turn, said folded mattress is arranged between two consecutive ones of said rows of elements and surrounds two consecutive ones of said rows of elements.

* * * * *